(12) United States Patent
Pühler et al.

(10) Patent No.: US 9,829,326 B2
(45) Date of Patent: Nov. 28, 2017

(54) METHOD, SYSTEM AND VEHICLE FOR CONDUCTING GROUP TRAVEL

(71) Applicant: AUDI AG, Ingolstadt (DE)

(72) Inventors: Maximilian Pühler, München (DE);
Hubert Fischer, Aichach (DE);
Michael Schermann, Freising (DE);
Tobias Schlachtbauer, Garching (DE);
Sergej Truschin, Garching (DE);
Thomas Wolf, Siegertsbrunn (DE);
Helmut Krcmar, Kranzberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/394,377

(22) PCT Filed: Oct. 19, 2012

(86) PCT No.: PCT/EP2012/004396
§ 371 (c)(1),
(2) Date: Oct. 14, 2014

(87) PCT Pub. No.: WO2013/152783
PCT Pub. Date: Oct. 17, 2013

(65) Prior Publication Data
US 2015/0120181 A1    Apr. 30, 2015

(30) Foreign Application Priority Data
Apr. 14, 2012   (DE) .................. 10 2012 007 856

(51) Int. Cl.
*G01C 21/36* (2006.01)
*G01C 21/34* (2006.01)
(Continued)

(52) U.S. Cl.
CPC ......... *G01C 21/3438* (2013.01); *G08G 1/205* (2013.01); *G08G 9/00* (2013.01); *H04L 67/12* (2013.01); *H04W 4/046* (2013.01)

(58) Field of Classification Search
None
See application file for complete search history.

(56) References Cited

U.S. PATENT DOCUMENTS

| 6,249,232 B1 | 6/2001 | Tamura | |
| 2006/0161341 A1* | 7/2006 | Haegebarth | G08G 1/20 701/117 |

(Continued)

FOREIGN PATENT DOCUMENTS

| CN | 101325003 A | 12/2008 |
| CN | 1020446164 A | 5/2011 |

(Continued)

OTHER PUBLICATIONS

International Search Report issued by the European Patent Office in International Application PCT/EP2012/004396.

(Continued)

*Primary Examiner* — Rami Khatib
*Assistant Examiner* — Gerrad A Foster
(74) *Attorney, Agent, or Firm* — Henry M. Feiereisen LLC

(57) ABSTRACT

A method for conducting group travel, wherein a subsequent group travel participant follows a group travel participant travelling ahead or the subsequent group travel participant drives to a current destination of group travel participant travelling ahead, includes the steps of: assigning a group travel identifier for a journey of the group travel participant travelling ahead; passing on the group travel identifier from the group travel participant travelling ahead to the subsequent group travel participant; transmitting navigation infor- (Continued)

mation of the group travel participant travelling ahead to a distribution unit in a context with the group travel identifier; transmitting the navigation information from the distribution unit to the subsequent group travel participant; and using the navigation information transmitted from the distribution unit by the subsequent group travel participant.

15 Claims, 3 Drawing Sheets

(51) Int. Cl.
    *G08G 1/00*        (2006.01)
    *G08G 9/00*        (2006.01)
    *H04L 29/08*      (2006.01)
    *H04W 4/04*       (2009.01)

(56) References Cited

U.S. PATENT DOCUMENTS

2008/0231507 A1* 9/2008 Burckart ................ G01C 21/20
                                                         342/357.52
2010/0033347 A1* 2/2010 Hayashi ................ G08G 1/017
                                                         340/905
2012/0046860 A1* 2/2012 Curtis ................ G06Q 30/0282
                                                         701/418

FOREIGN PATENT DOCUMENTS

| DE | 100 22 357 | 1/2001 |
|---|---|---|
| DE | 10 2005 055 371 | 5/2007 |
| DE | 60 2005 001 841 | 4/2008 |
| DE | 11 2009 001 007 | 2/2011 |
| EP | 1 434 032 | 6/2004 |
| EP | 1 681 663 | 7/2006 |

OTHER PUBLICATIONS

Chinese Search Report dated Mar. 3, 2016 with respect to counterpart Chinese patent application 201280072390.2.

English translation of Chinese Search Report dated Mar. 3, 2016 with respect to counterpart Chinese patent application 201280072390.2.

* cited by examiner

METHOD, SYSTEM AND VEHICLE FOR CONDUCTING GROUP TRAVEL

CROSS-REFERENCE TO RELATED APPLICATIONS

This application is the U.S. National Stage of International Application No. PCT/EP2012/004396, filed Oct. 19, 2012, which designated the United States and has been published as International Publication No. 2013/152783 and which claims the priority of German Patent Application Serial. No. 10 2012 007 856.0, filed Apr. 14, 2012, pursuant to 35 U.S.C. 119(a)-(d).

BACKGROUND OF THE INVENTION

The present invention relates a method for conducting group travel, in which a subsequent group travel participant follows group travel participant travelling ahead or drives to a current destination of group travel participant travelling ahead. The term group travel participant refers to a participant of group travel. Within the context of the method, any number of subsequent group travel participant can in principle participate in the group travel. In the degenerate case, only one pair of one group travel participant travelling ahead and exactly one subsequent group travel participant takes part in the group travel. In principle, each of the group travel participant can use the service (for example, with a Smartphone) while walking or on a bicycle or with any other means of transportation. Also, within the context of group travel, a use encompassing more than one type of transportation (bus, rail, aircraft, taxi etc.) is possible.

The invention also relates to a system.

Furthermore, the invention relates to a vehicle. The vehicle may be a land vehicle, a watercraft or an aircraft.

So far, the known options for driving to a destination and/or to an intermediate destination with several vehicles on the same route are inadequate, when the destination or the intermediate destination are defined only during the journey or are changing during the journey. EP 1 681 663 B1 describes a method, wherein which route guidance instructions for a subsequent vehicle are calculated on the basis of current positions a vehicle travelling ahead and a subsequent vehicle. To form a travel group for group travel, a query participating in the group travel with a vehicle-specific ID and a position of the vehicle are transmitted by each vehicle to a central server. The server recognizes the shared identity of a group based on the considerable agreement of the vehicle positions.

With the known method, all group travel participant must the begin group travel in the vicinity of a common starting point. A problem arises that the group travel participant must not only start from a location in the vicinity of a common starting point, but that they must also arrive in the vicinity of the common starting point at the same time. At least one of these boundary conditions is unacceptable in many situations, for example when the group travel participant travel to a common destination (for example, a meeting location for a family celebration or for a lecture), but want to start the group travel from home or from different corporate sites, without the need to take a detour via the starting point of the group travel participant travelling ahead.

The known method also has a likelihood of causing confusion, when it cannot be ruled out that several travel groups come together at the same time (for example, on a parking lot of an airport or an exhibition center). In addition, with the known method, the positions of all group travel participant must be transmitted to the central server at the start of the journey. Therefore, a privacy issue arises for the subsequent group travel participant, namely that it may not be preventable without special arrangements that an identity and/or a position of subsequent group travel participant is intercepted during the transmission to the server or when the server is wiretapped. In this way, another person who is not a participant of the group travel may then obtain information about the identity and/or the whereabouts of subsequent group travel participant and may use this information in an undesirable way to determine who participates in the group travel and/or may use this information to begin tracking the subsequent group travel participant.

SUMMARY OF THE INVENTION

It is an object of the present invention to provide a method for conducting group travel, wherein the route or a destination of the group travel is not known to at least the subsequent group travel participant before the group travel begins, while the subsequent group travel participant nevertheless do not need to assemble in the vicinity a common starting point.

According to the invention, a method for conducting group travel is provided, in which a subsequent group travel participant follows group travel participant travelling ahead or drives to a current destination of the group travel participant travelling ahead, wherein the method includes the following steps:

assigning group travel identifier for a journey of the group travel participant travelling ahead;

passing on the group travel identifier of the group travel participant travelling ahead to the subsequent group travel participant;

transmitting a navigation information of the group travel participant travelling ahead to a distribution unit within a context relating to the group travel identifier;

transmitting the navigation information from the distribution unit to the subsequent group travel participant;

using the transmitted navigation information by the subsequent group travel participant.

The step of transferring the group travel identifier from the group travel participant travelling ahead to the subsequent group travel participant may take place before, after or at the same time when navigation information of the group travel participant travelling ahead is transmitted to the distribution unit. For example, a road user who is initially not involved in the group can be invited by the group travel participant travelling ahead during the group travel to participate in the group travel by transferring the group travel identifier via telephone. According to a preferred embodiment, the navigation information is transmitted from the distribution unit to the subsequent group travel participant as a reply to a query message from the subsequent group travel participant to the distribution unit, wherein the query message contains the group travel identifier.

The object thereby is solved with respect to the system in that the system is prepared to perform method steps of the aforedescribed method.

The object is solved with respect to the vehicle in that the vehicle includes a system according to the invention.

By using the group-travel-specific group travel identifier, the subsequent group travel participant can retrieve the navigation information of the group travel participant travelling ahead from a server or filter out the navigation information from a data stream (for example, from a data stream of a wireless distribution service). In contrast to the known method, the group travel participant does not need to disclose information about himself in order to participate in the group travel, nor does he need to arrive at a certain location in order to participate in the group travel. The low complexity of the proposed method promotes standardization, so that a standardization that encompasses several carriers and/or manufacturers and use of the method according to the invention for implementing group travel also appears feasible.

Advantageously, the navigation information may be transmitted from the distribution unit to the subsequent group travel participant only when a prior step has occurred: transmitting the group travel identifier by the subsequent group travel participant to the distribution unit. This makes it more difficult for persons that have not been invited to the group travel to investigate or utilize the navigation information. The step of transmitting navigation information of the group travel participant travelling ahead to a distribution unit may occur before, after or simultaneously with the step of transmitting the group travel identifier by the subsequent group travel participant to the distribution unit.

The navigation information typically includes at least one start position and/or at least one current position and/or at least one current destination and/or at least one current route of the group travel participant travelling ahead. Advantageously, new navigation information may be transmitted to the distribution unit by the group travel participant travelling ahead in regular time intervals and/or when the current position changes by a predetermined minimum amount and/or when the current route changes and/or when an intermediate destination is added or deleted.

Preferably, the group travel participant travelling ahead may transmit the group travel identifier to the subsequent group travel participant via another transmission path different from the navigation information. In this way, a third person who successfully intercepted the navigation information of the group travel participant travelling ahead will then still not be able to associate the navigation information with the subsequent group travel participant. The information about the identity and/or the location of the subsequent group travel participant is thereby protected. A connection channel may be used for the other transmission path that is protected by encrypting or encoding or another available service suitable for transmitting of text or voice messages. Examples herefor are telephone calls, two-dimensional codes, near field communication, voice mail, facsimile, Email, SMS, a instant messaging service (for example, SKYPE™, ICQ™), a social network (for example, FACEBOOK™, TWITTER™), an online forum or another suitable portal.

Advantageously, the group travel participant travelling ahead may be able to define the group travel identifier for the group travel from one basic set of possible group travel identifiers. In this way, for example, people attending a party may spontaneously arrange group travel even without having access to a registry by using a freely invented group travel identifier. It is particularly advantageous when instead of one pure sequence of digits also natural terms, such as 'Wedding of Manfred and Irmgard' can be chosen.

The generation or selection of group travel identifier with sufficient password strength may be supported with a tool installed, for example, as an App on a Notebook or Smartphone of any person. It is not is required that this person is group travel participant. In a preferred embodiment, the tool supporting the generation of group travel identifier assists at the same time with memorizing the generated group travel identifier of group travel participants without technical assistance (i.e. the generated group travel identifier is sufficiently memorable).

These considerations will now be explained in more detail with reference to the following examples. An App on the Smartphone asks for the desired group travel identifier. A group travel participant then enters 'Wedding of Manfred and Irmgard'. The App checks the password strength and determines that the password strength is sufficient and then releases the selected group travel identifier for use. In another example, 'Baptism of Kevin' is entered is entered as a desired group travel identifier. The App checks the password strength and determines that the password strength is insufficient and then asks for the location where the Baptism is to take place, appends the location (for example, 'Niederaubach') to the initially desired group travel identifier 'Baptism of Kevin', checks the password strength and determines that the password strength is now sufficient and suggests as a usable group travel identifier 'Baptism of Kevin in Niederaubach'.

A manually entered or machine-generated group travel identifier may be transmitted, for example, via Near Field Communication between Smartphones. In addition, the group travel identifier may be displayed on the display of the Smartphone on which it was entered or generated, where it can be read with the camera of the Smartphones of the other group travel participants. In this way, the group travel identifier may also be forwarded via Smartphones of people who otherwise do not participate in the further implementation of the group travel.

The use the group travel identifier can be restricted to certain people and/or to people belonging to a specific group by using context transmitted with or in the group travel identifier and filtering in the distribution unit and/or in the navigation system of the group travel participant travelling ahead and/or the subsequent group travel participant.

In a particularly preferred embodiment, by using a registry for group travel identifiers and/or an allocation rule, a once specified group travel identifier will not be assigned at least for the duration of a predetermined protected period at least with high probability to another group travel of any other road user. This prevents or at least makes very unlikely confusion between different group travels. The registry may be, for example, a database running on a server.

According to another embodiment, the registry may be prepared to assign a group travel identifier for his group travel in response to an inquiry from the group travel participant travelling ahead and to pass on the assigned group travel identifier to the group travel participant travelling ahead. This eliminates the need for the group travel participant travelling ahead to select and input group travel identifier, thus lessening the likelihood of confusion.

In a particular preferred embodiment, the navigation information and/or the group travel identifier may not be transmitted from or to group travel participant together with a component of vehicle license plate and/or together with location information. This approach makes it more difficult to identify and/or locate at least one the group travel participants and enhances data privacy.

The present invention will now be explained in more detail with reference to the accompanying drawings, which show in:

DETAILED DESCRIPTION OF PREFERRED EMBODIMENTS

The following exemplary embodiments described hereinafter in more detail represent preferred embodiments of the present invention.

Figure 1:
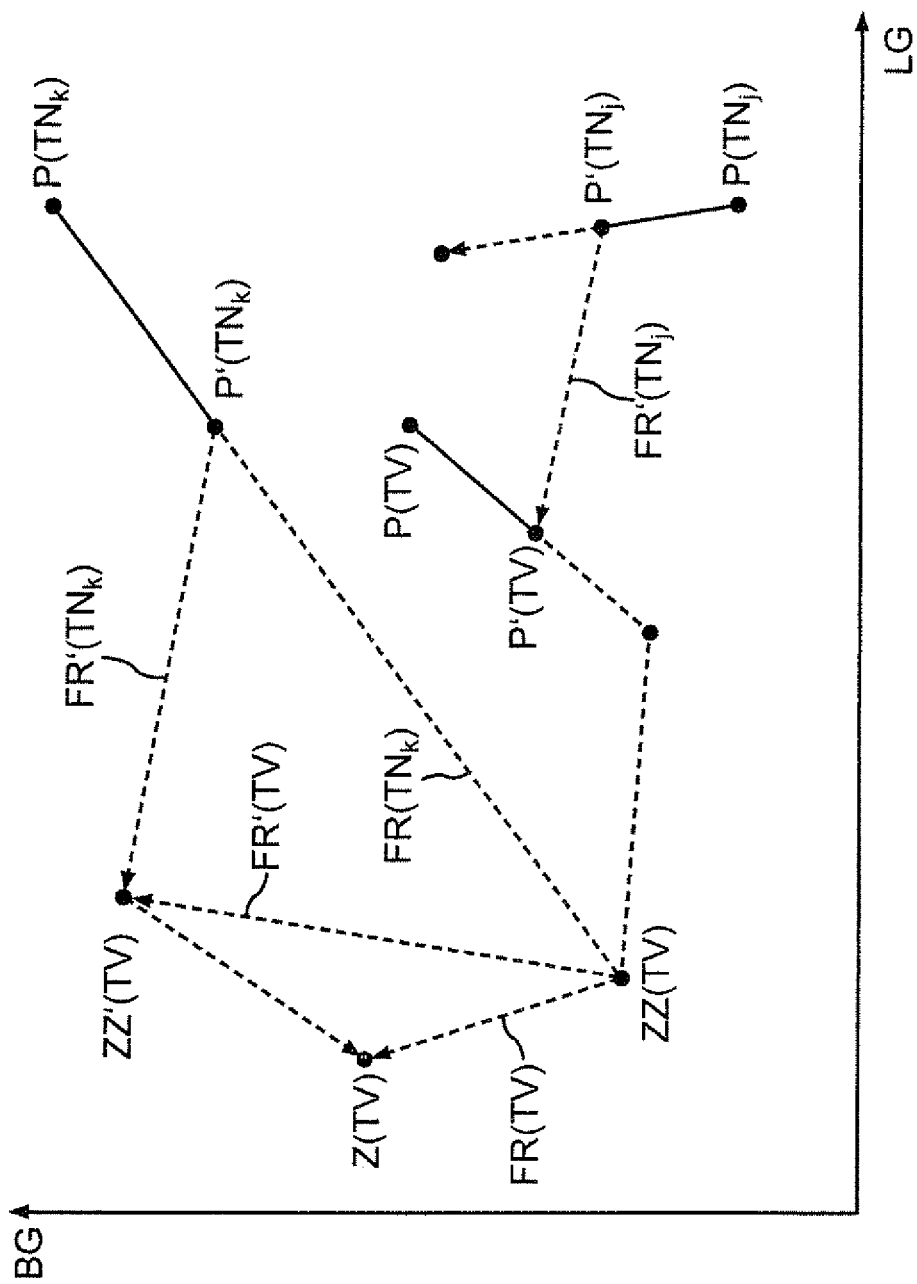
FIG. 1 a schematic example of a current spatial arrangement of participants, routes, destinations and intermediate destinations of group travel.

A possible progression of group travel GF will be explained based on of two-dimensional diagram of FIG. 1 with longitudes LG and latitudes BG (initially without details of the proposed information exchange). The diagram shows starting positions $P(TV)$, $P(TN_j)$, $P(TN_k)$ of group travel participant TV travelling ahead and of two subsequent group travel participants $TN_j$, $TN_k$. In a first phase, the group travel participant TV travelling ahead follows a first route $FR(TV)$ to a first destination $Z(TV)$.

A first $TN_j$ of the two subsequent group travel participant $TN_j$, $TN_k$ drives continuously to the last known current position $P'(TV)$ of group travel participant TV travelling ahead. The subsequent group travel participant $TN_j$ can use therefor a dedicated navigation system, which calculates a route $FR(TN_j)$ of his current position $P'(TN_j)$ in relation to the current position $P'(TV)$ of group travel participant TV travelling ahead and displays driving recommendations. This embodiment is preferably used when a destination $Z(TV)$ of the group travel participant TV travelling ahead shall not or cannot be communicated to the subsequent group travel participant $TN_j$. For example, exploratory journeys or personal protection journeys can be carried out in this away in a loose travel complex.

In one preferred embodiment of the method, the subsequent group travel participant drives exactly a planned route and/or the current route of the vehicle travelling ahead. This may be advantageous when realizing that the route is difficult or when the group travel participant travelling ahead knows the area and thus knows a better route, for example to avoid construction sites and congestion.

When the group travel participant TV travelling ahead has driven to the new location. $P'(TV)$, the subsequent group travel participant $TN_j$ receives information about this new location $P'(TV)$ of the group travel participant TV travelling ahead. The solid lines show those sections of the routes $FR(TV)$ $FR(TN_k)$, $FR(TN_j)$ that were traveled during this time. The dashed lines show those sections of the routes $FR(TV) FR(TN_k)$, $FR(TN_j)$ and $FR'(TV) FR(TN_k)$, $FR'(TN_j)$ that were planned until that time, but have not yet been traveled. Because the subsequent group travel participant TN has in the meantime driven to the new location $P'(TN_j)$, the navigation system of the subsequent group travel participant $TN_j$ now calculates a new route $FR'(TN_j)$ for the subsequent group travel participant $TN_j$.

The other subsequent group travel participant $TN_k$ knows the current route $FR'(TV)$ of the group travel participant TV travelling ahead and drives to one of the following locations of the current route $FR'(TV)$ of the group travel participant TV travelling ahead to: the starting point $P'(TV)$ of the current route $FR'(TV)$ of group travel participant TV travelling ahead, the current location $P'(TV)$ of the group travel participant TV travelling ahead, the current destination $Z'(TV)$ of the group travel participant TV travelling ahead, a current intermediate destination $ZZ'(TV)$ of the current route $FR'(TV)$ of the group travel participant TV travelling ahead. This subsequent group travel participant $TN_k$ can also use an onboard navigation system, which calculates a route $FR'(TN_k)$ from its current location $P'(TN_k)$ to one of the aforementioned locations and displays corresponding driving recommendations.

When a destination $Z(TV)$, an intermediate destination $ZZ(TV)$ and/or the route $FR(TV)$ of group travel participant TV travelling ahead changes, the subsequent group travel participant $TN_k$ is informed about the new destination $Z'(TV)$, the new intermediate destination $ZZ'(TV)$ and/or the new current route $FR'(TV)$ of the group travel participant TV travelling ahead. Because the subsequent group travel participant $TN_k$ has meanwhile traveled to the new location $P'(TN_k)$, the navigation system of the subsequent group travel participant $TN_k$ now calculates a new route $FR'(TN_k)$ for the subsequent group travel participant $TN_k$ to the new destination $Z'(TV)$, to the new intermediate destination $ZZ'(TV)$ of the new current route $FR'(TV)$ of group travel participant TV travelling ahead or to his current location $P'(TV)$. The selection the new destination location to be approached by the subsequent group travel participant $TN_k$ may be optimized (for example, with regard to the energy demand and/or the required time). The new destination location to be approached by subsequent group travel participant $TN_k$ may be selected by taking into account boundary conditions, such as tonnage restrictions, vehicle size restrictions, restrictions or options for using ferries, of vehicle shipments, of toll roads and/or for transporting hazardous materials. The new destination to be approached by the subsequent group travel participant $TN_k$ location must not necessarily be located on a route $FR(TV) FR'(TV)$ of the group travel participant travelling ahead.

Figure 2:
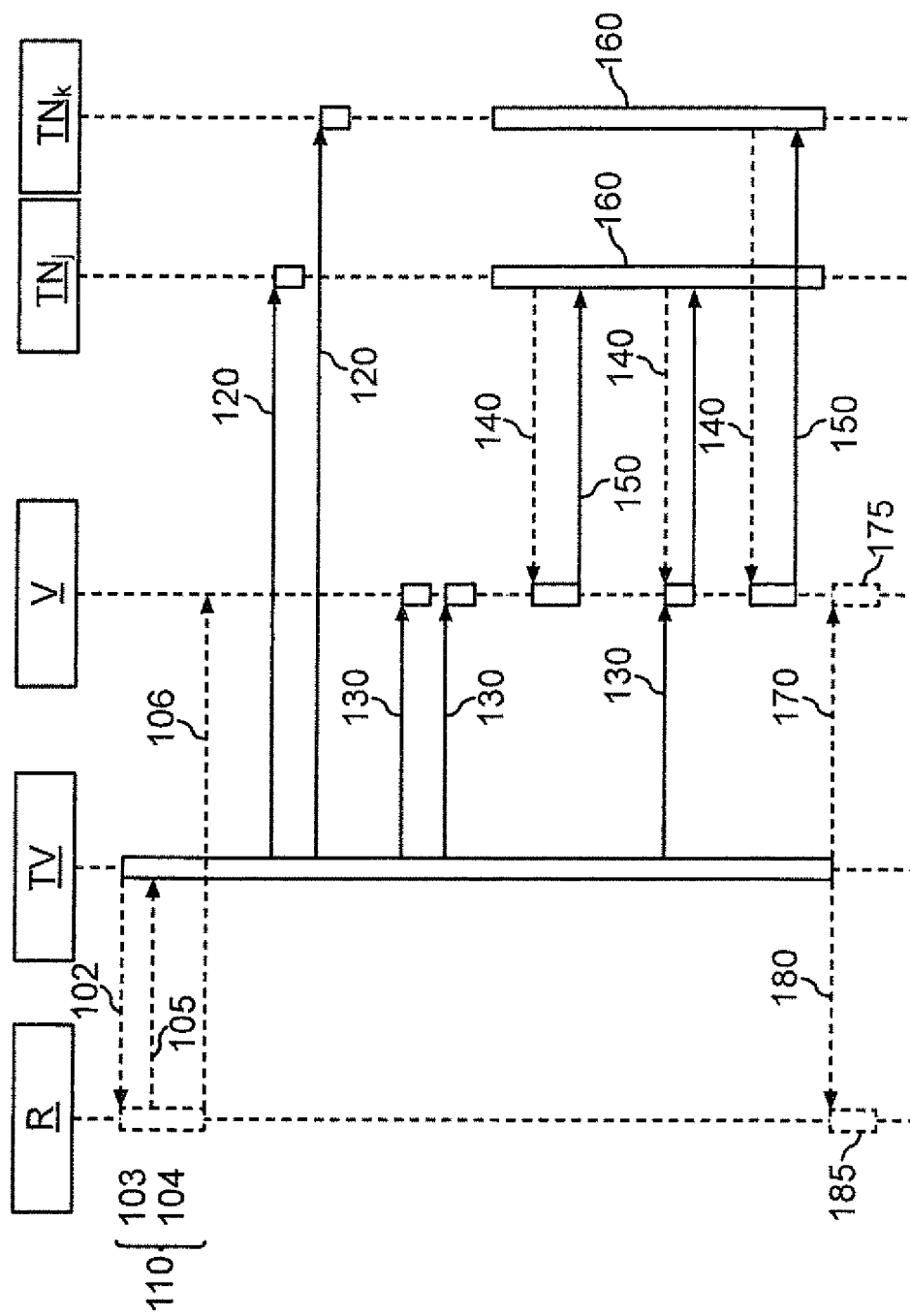
FIG. 2 a schematic message exchange diagram of an exemplary embodiment of a method for conducting group travel.

FIG. 2 shows an example for a possible information exchange for conducting group travel GF, as has been explained with reference to FIG. 1.

Each group travel GF requires a group travel identifier K, which makes the group travel GF distinguishable from other group travels. The described embodiments assume that the group travel identifier K is a temporary key, which may also be referred to as 'unique temporary identity'. Each assigned group travel identifier K should not be used for or assigned to any other group travel at least for the duration of a protective period (for example two years).

However, in other scenarios, a reuse of the same group travel identifier may be desirable for various travels. As an example: parents in the football club receive from the coach group travel identifier so as to be able to follow the coach for each away game in a vehicle column to the destination.

Various possibilities exist for generating group travel identifiers K. For example, a registry R (directory service) may generate in a process 103 for each road user considered as a potential group travel participant TV travelling ahead one or several group-travel-specific group travel identifiers GF to be kept available. The group-travel-specific group travel identifiers K kept available can be transmitted to the potential group travel participant TV travelling ahead (similar to a TAN-list) via a transmission 105, for example via Email, SMS, via an Instant Messaging Service (such as Skype™ or ICQ™), via a social Network (such as Facebook™ or Twitter™), via an online forum, via a suitable portal or via the postal service in plain text or on a Smartcard or in an Internet service via download. This may occur upon request (via message 102) by the group travel participant TV travelling ahead or may also be unsolicited, for example in the context of a promotion. The dashed lines show optional protocol elements.

Furthermore, the group travel participant TV travelling ahead may himself devise group travel identifier K, which with high probability will not be used by any other group travel participant TV. This has the advantage that no device needs to be used for assigning the group travel identifier K and also not a link to a registry R. For example, the group travel participant TV travelling ahead may spontaneously devise an event-driven, easily memorable group travel identifier K (for example 'Wedding of Manfred and Irmgard') and immediately communicate the group travel identifier K to attendees who he wants to invite to the group travel GF. This succeeds also when the invitation occurs at a location (for example, inside a building) where a link to a registry R cannot be established where wireless coverage is inadequate. The generation or selection of a group travel identifier K with sufficient password strength may be supported by a tool installed on a Smartphone as an App.

Optionally, the conceived group travel identifier K may be transmitted by a message 102 to a registry R for the purpose of registration 104 and/or for checking 104 its usability. According to another embodiment, the registration 104 and/or checking 104, when successful, may be answered by the registry R by a message 105 with a positive acknowledgment PQ. According to another independent embodiment, the registration 104 and/or checking 104, when not successful, may be answered by the registry R by a message 105 with a negative acknowledgment NQ.

The group travel participant TV travelling ahead transmits the group travel identifier K through messages 120 to all subsequent group travel participant $TN_j$, $TN_k$ of the group participating in the group travel GF. The group travel identifier K may provided to the be invited group travel participant $TN_j$, $TN_k$ for example orally or in writing in the presence of the invited group travel participant $TN_j$, $TN_k$, by telephone, by voice mail, by Email, SMS, by facsimile, via the postal service in plain text or by a Smartcard transmitted or provided in a Internet service for downloading. This may also take place upon request or even unsolicited, for example in the context of a promotion.

The group travel participant TV travelling ahead transmits before, during or after the journey with one or more messages 130 one or several items of navigation information N with context relating to the group travel identifier K to a distribution unit V. The navigation information N may, for example, include at least one start location P(TV) and/or at least one current location P'(TV) and/or at least one current destination Z'(TV) and/or a current route FR'(TV) of the group travel participant TV travelling ahead.

The context may for example include that the group travel identifier K is transmitted during the transmission 130 of the navigation information N. Advantageously, this obviates the need for the distribution unit V to contain a kind of identity of the group travel participant TV travelling ahead or to distinguish at all between different potential group travel participants TV travelling ahead. The protection of the information about the current location P'(TV) of the group travel participant TV travelling ahead can be improved in that the navigation information N omits and/or falsifies the current location P'(TV) and preferably also some locations surrounding the current location P'(TV) and/or delays their transmission.

According to one variant for the context formation, the group travel participant TV travelling ahead may register himself at the distribution unit V with a dedicated subscriber identity (for example, a MSISDN or an IMEI or an account of an Internet service) by way of a first message 130 and therewith transmits the group travel identifier K. When the group travel participant TV travelling ahead then repeats at each transmission 130 of navigation information N his own subscriber identity, the distribution unit V can then establish the context between navigation information N and group travel identifier K even when the group travel identifier K is not included in the transmission of the navigation information N. When the group travel participant TV travelling ahead is forced by technical circumstances to register with the distribution unit V with his own subscriber identity (for example, MSISDN or IMEI or an account an Internet service), this context formation has the advantage that a person (for example, a subsequent group travel participant), who knows the group travel identifier K, is unable to feign to be group travel participant TV travelling ahead having the same group travel identifier K, without being later detected. According to another possible embodiment, the registration of the own subscriber identity occurs in the framework the above-mentioned registration 104 at the registry R and the registry R forwards the context between the subscriber identity and the group travel identifier K to the distribution unit V by way of a message 106. This can prevent from the beginning that a person (for example, a subsequent group travel participant $TN_j$, $TN_k$), who knows the group travel identifier K, can pretend to be group travel participant TV having the group travel identifier K.

According to an independent embodiment, the group travel participant TV travelling ahead may cause a deletion 175 of group travel specific data saved in the distribution unit V by using a delete command 170 transmitted to the distribution unit V. Alternatively or additionally, according to another embodiment, the group travel participant TV travelling ahead may cause in the registry R a deletion 185 of subscriber-related registration data of the group travel GF by way of a delete command 180 to the registry R.

Alternatively or additionally, data stored at the registry R and/or at the distribution unit V may also be deleted following a predetermined waiting period after registration 104, following transmission 140 the last location query by a subsequent group travel participant TN and/or following transmission 130 of a last location report of group travel participant TV travelling ahead based on elapsed time. This measure can also improve the protection of location information P(TV), P'(TV) and/or of participant information.

Advantageously, the distribution unit V may reside on a server located outside the vehicles and used by group the travel participant TV travelling ahead and the subsequent group travel participants $TN_j$, $TN_k$ for the group travel GF. In this way, a distribution unit V with optimal quality of service can be provided for all group travel participant TV, $TN_j$, $TN_k$. For some applications, for example deployment in disaster areas or maneuvers at sea, it may be advantageous for the distribution unit V to also be mobile. For this purpose, the distribution unit V may be located in a vehicle; however, the vehicle in which the distribution unit V is located need not be used by one of the group travel participant TV, $TN_j$, $TN_k$.

Independent thereof, the registry R may be disposed on a server located outside the vehicles used for the group travel GF by the group travel participant TV travelling ahead and the subsequent group travel participants $TN_j$, $TN_k$. In this way, a registry R with one optimal quality of service can be provided for all group travel participant TV, $TN_j$, $TN_k$. For some applications, for example deployment in disaster areas or maneuvers at sea, the distribution unit V may advantageously also be mobile. For this purpose, the distribution unit V may reside in a vehicle; however, the vehicle in which the distribution unit V is located need not be used by one of the group travel participant TV, $TN_j$, $TN_k$. The registry R and the distribution unit V may be arranged at same location. They can also be realized in a same server.

Figure 3:
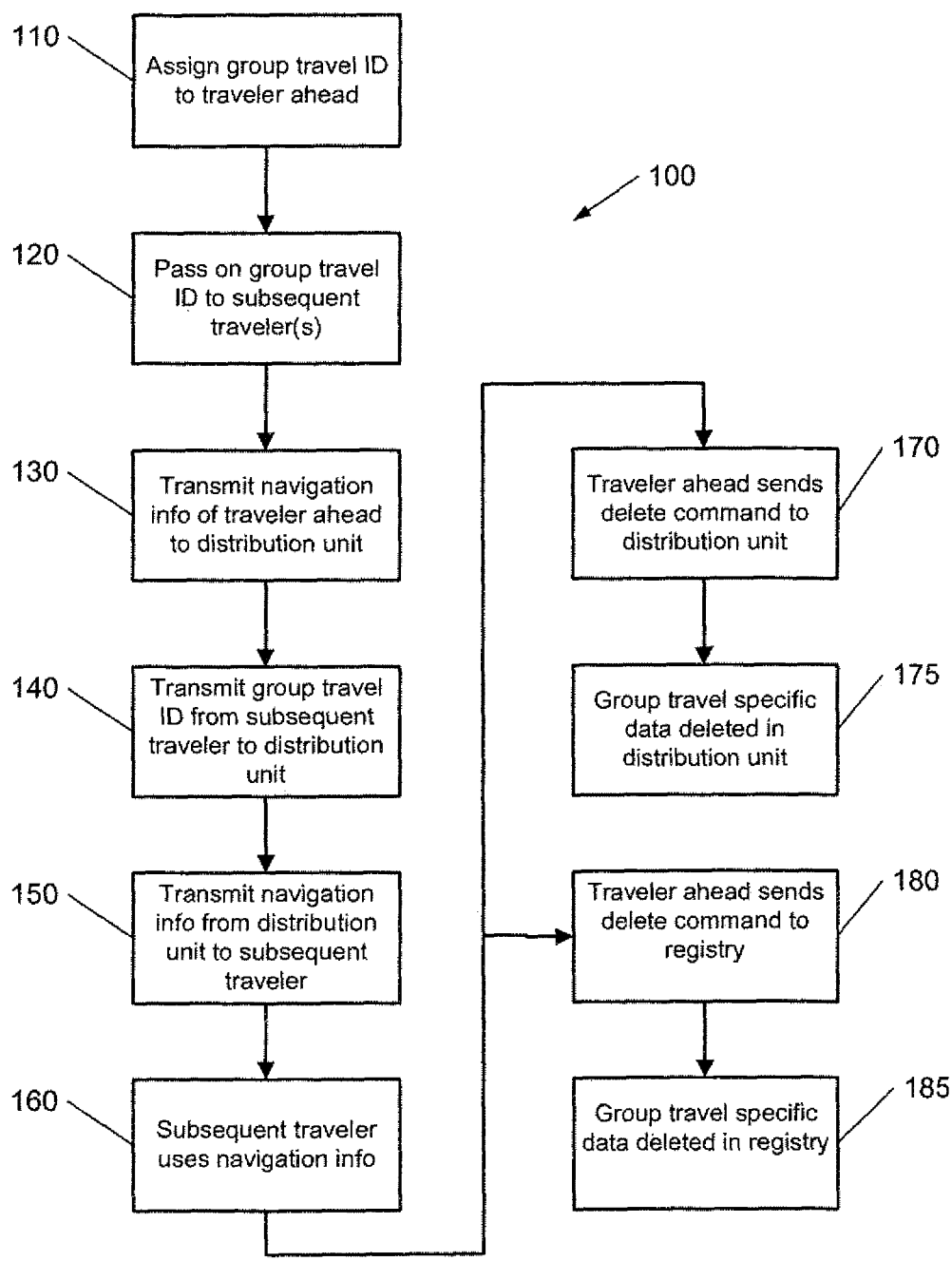
FIG. 3 schematically, a flow diagram of a method for conducting group travel.

The method 100 illustrated in FIG. 3 for conducting group travel, in which a subsequent group travel participant $TN_j$, $TN_k$ follows group travel participant TV travelling ahead or drives to a current destination Z(TV) of the group travel participant TV travelling ahead, includes following steps. In a first step 110, a group travel identifier K for a trip of group travel participant TV travelling ahead is assigned. In a second step 120, the group travel identifier K of the group travel participant TV travelling ahead is passed on to the subsequent group travel participant(s) $TN_j$, $TN_k$. In a third step 130, a navigation information N of the group travel participant TV travelling ahead is transmitted to a distribution unit V in a context to the group travel identifier K. In a fourth step 140, the group travel identifier K is transmitted by the subsequent group travel participant $TN_j$, $TN_k$ to the distribution unit V. In a fifth step 150, the navigation information N is transmitted by the distribution unit V to the subsequent group travel participant $TN_j$, $TN_k$. In a sixth step 160, the submitted navigation information N is used by the subsequent group travel participant $TN_j$, $TN_k$.

The fourth step 140 may be omitted when in the fifth step 150 the navigation information N is transmitted by the distribution unit V to the subsequent group travel participant $TN_j$, $TN_k$ by way of a broadcast service or via an Internet service accessible to all potential subsequent group travel participants and the navigation information can be filtered out from the information flow by the subsequent group travel participant based the group travel identifier K (for example, from an Internet page). In this case, the group travel identifier then preferably does not contain content such as 'Wedding of Manfred and Irmgard'.

In daily life, the question often arises where a person is localized and what the direct route is to this location. A possible application scenario relates to the communication of one's own current location to friends so as to facilitate a meeting. Although solutions such as Google Latitude, social Networks (such as FACEBOOK™ and TWITTER™) or Applications such as WhatsApp for current Smartphones with Apples iOS or the Google operating system Android mostly meet these requirements, they are not suitable for the following application scenarios.

When driving in a convoy and only the driver of the head vehicle knows the route, the subsequent group travel participants must not lose sight of the group travel participant travelling ahead or must at least find out in other ways, for example by mobile radio, how the group travel participant travelling ahead has driven. In some situations, it may also be important to follow exactly the same route FR. Because these situations may spontaneously occur, it cannot be assumed that all members of the convoy are interconnected via a social network or a similar platform. Spontaneous following should nevertheless be possible.

In the following, examples for known services will be listed that can be used to locate other people:

Google Latitude is a location-based service for Smartphones for releasing one's own location to other user of the service. The exchange of locations is here complicated, because a prior registration with the service is required and moreover an explicit approval from the involved people is required.

WhatsApp Messenger is a location-based application for Smartphones, with a functionality similar to Google Latitude. The notification and the representation the own location on a map is not dynamic and must hence each time be initiated by the user.

Twitter, Facebook and other social networks allow their users to communicate their current location via a status update. This information is hence communicated also to people who should not find out or are not interested in the current location.

All known solutions on this field have the following disadvantages for the application scenario described with reference to FIG. 1. Before use, a registration at the service must occur, and contact information must be exchanged ("become friends"). Thus, no spontaneous use is possible. The release of the location must, for example with WhatsApp or the social Networks such as Facebook, each time be initiated by the user and includes only the location current at that time. The location is not dynamically updated/notified. With some solutions, releasing one's own location to others has the result that this release is permanent. This creates the possibility for undesirable tracking. The continuous announcement of the location can only be prevented by renouncing the friendship in the network or the blocking the respective user. Although routes to tracked persons can be dynamically created, tracing of how a person (or the vehicle) walked/was driven is impossible. This is useful in particular when the driver travelling ahead local knows his way around and knows of a particularly good route.

With the present invention, a method is provided which supports and simplifies driving in a convoy to a dynamic destination. The term convoy refers to a group of vehicles that travel together at least as along a section of the route and/or for a specific time. Accordingly, the group travel participant TV, $TN_j$, $TN_k$ need not necessarily have the same destination. Depending on the application scenario, the group travel identifier K and/or navigation information N may also be transmitted to subsequent group travel participants $TN_j$, $TN_k$ only in the course group travel OF that started initially without support from the method 100 according to the invention. It is not mandatory that the subsequent group travel participants $TN_j$, $TN_k$ know the group travel participant TV travelling ahead. Instead, a group travel identifier K is generated which is then passed on to subsequent group travel participants $TN_j$, $TN_k$.

According to a preferred embodiment, the vehicle travelling ahead continuously updates its current location P'(TV) during the group travel GF. The location information P'(TV) is linked with the group travel identifier K and communicated via available communication channels to a central distribution unit V. The subsequent group travel participants $TN_j$, $TN_k$ can query at the distribution unit V the route FR'(TV) of the vehicle travelling ahead based on the group travel identifier K and can the adjust a route FR'($TN_j$), FR'($TN_k$) to be traveled by their navigation system. A visual contact to the vehicle travelling ahead is thus not required at any time of the navigation, because the drivers of the subsequent vehicles can easily follow the instructions of their respective navigation system. Moreover, the use of this method 100 can occur spontaneously by passing on a temporarily valid unique group travel identifier K. The group travel identifier K is valid only for a single group travel or journey GF. This improves the protection of location information of the group travel participant TV, $TN_j$, $TN_k$, because a potential attacker will find it more difficult to obtain an association of the group travel identifier K with group travel participant TV, $TN_j$, $TN_k$.

A possible application scenario is a spontaneous group travel GF (for example to a restaurant), wherein the number the group travel participant TV, $TN_j$, $TN_k$ exceeds the number spaces available in a vehicle and the group travel participant TV travelling ahead does not know the exact address of the destination. The need for visual contact by the subsequent group travel participants $TN_j$, $TN_k$ to the vehicle travelling ahead should thus become unnecessary, because the participants would otherwise no longer be able to follow the vehicle travelling ahead after losing visual contact. Exclusive reliance on visual contact unnecessarily distracts the subsequent group travel participant $TN_j$, $TN_k$ from observing the road and impairs the road safety, because the subsequent group travel participant $TN_j$, $TN_k$ needs to maintain the visual contact in order to be able to follow the group travel participant TV travelling ahead. The same applies also for ,he group travel participant TV travelling ahead, provided that he wants to show consideration for the subsequent group travel participant $TN_j$, $TN_k$. When visual contact is lost, use of a mobile communication service may be required. The then necessary navigation to the destination by telephone is often possible only with inaccurate navigation information and with significant complications, which additionally distracts the group travel participant TV, $TN_j$, $TN_k$ from observing the road traffic. In the worst scenario, this distraction can lead to a traffic accident.

Additional conceivable scenarios include a common city tour with several vehicles without a specific final destination or a common trip along longer distances, for example vacation travel. It may happen that no address is available for the destination and that only geographical coordinates can be used as reference, for example a lake or the site of an attraction.

The proposed method 100 has the following advantages:

Simplicity of the application: in contrast to existing services such as Google Latitude, neither prior registration at an online portal is required, nor must an authorization be given to others in order to see the current location.

Use in a convoy: with the proposed method, it is not only possible to see the current location of group travel participant travelling ahead, but also the route traveled by the group travel participant travelling ahead. The same route can thus be exactly followed.

Security: it is difficult even with this method 100 to identify the vehicle travelling ahead from a distance because the group travel identifier K is not associated with a vehicle license plate. It may also be stipulated that, in order to receive information from the distribution unit V, the group travel identifier K is or can be used only for a single group travel GF. Although movement profiles may be read out by an attacker, it is then still not clear to the attacker which vehicle this movement profile relates to.

Arbitrary technological support: due to the simplicity of method 100, the method 100 may be performed in a head unit of a vehicle or in a Smartphone. In addition, the group travel identifier K may be passed on orally, in writing or by way of two-dimensional codes, via contactless transmission media or via similar technologies.

What is claimed is:

1. A method for conducting group travel, wherein a subsequent group travel participant follows a route identified in a navigation information transmitted by a group travel participant travelling ahead, or the subsequent group travel participant drives to a current destination identified in the navigation information transmitted by the group travel participant travelling ahead, the method comprising: assigning a group travel identifier for a journey of the group travel participant travelling ahead; checking a password strength of the group travel identifier by an App and releasing or withholding the group travel identifier based on the password strength; transmitting the group travel identifier for the journey of the group travel participant travelling ahead to the subsequent group travel participant, said group travel participant travelling ahead, transmitting the group travel identifier to the subsequent group travel participant on a transmission path that is different from a transmission path via which the navigation information is transmitted, wherein the navigation information is transmitted by a telephone call; transmitting the navigation information provided by the group travel participant travelling ahead to a distribution unit in a context with the group travel identifier, without the distribution unit receiving information identifying the group travel participant travelling ahead except for the transmitted context of the group travel identifier and the navigation information provided to the distribution unit by the group travel participant travelling ahead; transmitting the navigation information from the distribution unit to the subsequent group travel participant; and said subsequent group travel participant using the navigation information transmitted from the distribution unit.

2. The method of claim 1, wherein the navigation information is transmitted from the distribution unit to the subsequent group travel participant only after the group travel identifier has been transmitted by the subsequent group travel participant to the distribution unit.

3. The method of claim 1, wherein the navigation information comprises at least one feature selected from a start location, a current location, a current destination and a current route of the group travel participant travelling ahead.

4. The method of claim 1, wherein the group travel participant travelling ahead selects the group travel identifier for the journey from a basic set of possible group travel identifiers.

5. The method of claim 1, wherein at least one of a registry for group travel identifiers and an allocation rule ensures at least with a high probability that a once specified group travel identifier is not assigned to another journey of another group travel participant until at least a predetermined protected period has expired.

6. The method of claim 5, wherein the registry is configured to assign a group travel identifier for the journey of the group travel participant travelling ahead in response to a query from the group travel participant travelling ahead and to transmit the assigned group travel identifier to the group travel participant travelling ahead.

7. The method of claim 1, wherein at least one of the navigation information and the group travel identifier is not transmitted from or to the group travel participant travelling ahead or from or to the subsequent group travel participant together with at least one of a part of a vehicle license plate and a location information.

8. The method of claim 1, further comprising the step of protecting the identity of a participant traveling ahead using one or more methods in a group comprising: delaying transmission of navigation information provided by the participant traveling ahead, omitting information about the present location of the participant traveling ahead, or falsifying information about the present location of the participant traveling ahead.

9. The method of claim 1, wherein the context of the navigation information transmitted by the participant who is traveling ahead to the distribution unit for a journey having a given group travel identifier includes an identifier of a communications channel that was previously used by the participant who is traveling ahead to transmit the given group travel identifier.

10. A system for conducting group travel, wherein a subsequent group travel participant follows a route identified in a navigation information transmitted by a group travel participant travelling ahead or the subsequent group travel participant drives to a current destination of the group travel participant travelling ahead, the system comprising:

a distribution unit, and a registry, wherein the system is configured to:

check a password strength of a group travel identifier by an App and release or withhold the group travel identifier based on the password strength and assign the group travel identifier for a journey of the group travel participant travelling ahead using the registry;

transmit the group travel identifier for the journey of the group travel participant travelling ahead to the subsequent group travel participant, said group travel participant travelling ahead, transmitting the group travel identifier to the subsequent group travel participant on a transmission path that is different from a transmission path via which the navigation information is transmitted, wherein the navigation information is transmitted by a telephone call;

transmit the navigation information provided by the group travel participant travelling ahead to the distribution unit in a context with the group travel identifier, without the distribution unit receiving information identifying the group travel participant travelling ahead except for the transmitted context of the group travel identifier; and transmit the navigation information from the distribution unit to the subsequent group travel participant.

11. The system of claim 10, wherein the system includes one or more means for protecting the identity of a participant traveling ahead in the group of means made up of: a) delaying transmission of navigation information provided by the participant traveling ahead, b) omitting information about the present location of the participant traveling ahead, or c) falsifying information about the present location of the participant traveling ahead.

12. The system of claim 10, wherein the context of the navigation information transmitted by the participant who is traveling ahead to the distribution unit for a journey having a given group travel identifier includes an identifier of a communications channel that was previously used by the participant who is traveling ahead to transmit the given group travel identifier.

13. A vehicle with a system for conducting group travel, wherein a subsequent group travel participant follows a route identified in a navigation information transmitted by a group travel participant travelling ahead or the subsequent group travel participant drives to a current destination of the group travel participant travelling ahead, the system comprising:

a distribution unit, and a registry, wherein the system is configured to:

check a password strength of a group travel identifier by an App and release or withhold the group travel identifier based on the password strength and assign the group travel identifier for a journey of the group travel participant travelling ahead using the registry;

transmit the group travel identifier for the journey of the group travel participant travelling ahead to the subsequent group travel participant, said group travel participant travelling ahead, transmitting the group travel identifier to the subsequent group travel participant on a transmission path that is different from a transmission path via which the navigation information is transmitted, wherein the navigation information is transmitted by a telephone call;

transmit the navigation information provided by the group travel participant travelling ahead to the distribution unit in a context with the group travel identifier, without the distribution unit receiving information identifying the group travel participant travelling ahead except for the transmitted context of the group travel identifier; and transmit the navigation information from the distribution unit to the subsequent group travel participant.

14. The vehicle of claim 13, wherein the vehicle includes one or more means for protecting the identity of a participant traveling ahead in the group made up of: a) delaying transmission of navigation information provided by the participant traveling ahead, b) omitting information about the present location of the participant traveling ahead, or c) falsifying information about the present location of the participant traveling ahead.

15. The vehicle of claim 13, wherein the context of the navigation information transmitted by the participant who is traveling ahead to the distribution unit for a journey having a given group travel identifier includes an identifier of a communications channel that was previously used by the participant who is traveling ahead to transmit the given group travel identifier.

* * * * *